US006554097B2

(12) United States Patent
König

(10) Patent No.: US 6,554,097 B2
(45) Date of Patent: Apr. 29, 2003

(54) LOW-RADIATION HEADPHONE

(76) Inventor: Florian Meinhard König, Schellenbergstrasse 7, D-82110 Germering (DE)

( * ) Notice: Subject to any disclaimer, the term of this patent is extended or adjusted under 35 U.S.C. 154(b) by 0 days.

(21) Appl. No.: 09/951,272

(22) Filed: Sep. 13, 2001

(65) Prior Publication Data

US 2002/0066617 A1 Jun. 6, 2002

(30) Foreign Application Priority Data

Sep. 13, 2000 (DE) ........................................ 100 45 177

(51) Int. Cl.[7] ................................................ H04N 25/00
(52) U.S. Cl. ........................................ 181/129; 181/130
(58) Field of Search ................................ 181/129, 130, 181/132, 133, 134, 135, 136, 137

(56) References Cited

U.S. PATENT DOCUMENTS 4,058,688 A * 11/1977 Nishimura et al. ......... 381/354
4,158,753 A * 6/1979 Gorike ........................ 381/19
4,278,852 A * 7/1981 Gorike ....................... 381/354
5,694,475 A * 12/1997 Boyden ...................... 381/327
5,737,436 A * 4/1998 Boyden ...................... 381/187
6,301,367 B1 * 10/2001 Boyden et al. ................ 2/209
6,373,942 B1 * 4/2002 Braund ........................ 79/430

FOREIGN PATENT DOCUMENTS

DE 197 23 644 12/1998

* cited by examiner

*Primary Examiner*—Kim Lockett
(74) *Attorney, Agent, or Firm*—Collard & Roe, P.C.

(57) ABSTRACT

The invention relates to a low-radiation headphone with right and left acoustic irradiation housings corresponding to the ears of the user, with each of the housings having an acoustic baffle (10") comprising MU-metal and accommodating dynamic audio transducers. The acoustic baffle (10") is formed in a manner permeable to sound in front of the audio transducers, and has a radiation dissipation zone (20) pointing at the temples of the user. The zone (20) dissipating radiation is provided through a greater density of the MU-metal than in the remaining area of the acoustic baffle (10") that is permeable to sound. The acoustic baffle (10") as a whole consists of MU-metal sheet and the audio transducer is perforated in one area (17), but otherwise solid. The radiation dissipation zone (20) is formed in the perforated area of the MU-metal sheet as one piece.

8 Claims, 3 Drawing Sheets

LOW-RADIATION HEADPHONE

INTRODUCTION

The invention relates to a low-radiation headphone with right and left acoustically irradiating housings associated with the ears of the user. These housings each have an acoustic baffle comprising MU-metal, which is a nickel alloy having high magnetic permeability, in which the dynamic audio transducers are arranged, whereby the acoustic baffle is formed in each case in front of the audio transducer so that it is permeable to sound, and there has a radiation-dissipating zone pointing at the temple of the user. This zone is provided with a higher density of MU-metal than in the remaining area of the acoustic baffle that is permeable to sound.

BRIEF DESCRIPTION OF THE PRIOR ART

Low-radiation headphones are known from DE 197 23 644 A1. This known headphone is designed to keep electric and magnetic fields away from the head of the headphone user. These electric and magnetic fields are generated by the audio transducers of the headphone and, in spite of the relatively low power consumption of a headphone, may not be inconsiderable because the audio transducers are arranged close to the head. Headphones with audio transducers in the form of electrostatic controllers typically generate electric fields in the order of magnitude of a few hundred volts per meter. The acoustic irradiation housings of such headphones are substantially screened on all sides. Special attention was paid to screening the area of the acoustic irradiation housing that is located directly adjacent to the head of the user of the headphone. The acoustic baffle of the acoustic irradiation housing is provided for this purpose in the form of a lattice that is coated with MU-metal. An advantageous side effect of this lattice-like design of the acoustic baffle is that the normally required protective cover of the audio transducers can be dispensed with. As an additional screening measure, provision is made in connection with the known headphone that it is provided with a radiation dissipation zone in the form of a MU-metal bridge that is tapered to a point. The tapered MU-metal bridge extends, starting from the edge of a coaxial audio transducer system, to pointing with its tip to the center of the system, and then extends starting from its tip, to the rear in an upwards slanting manner in order to dissipate electric and magnetic radiation in the direction from the temple of the headphone user. The MU-bridge is provided on the top side of the lattice-like acoustic baffle coated with MU-metal, and forms an element that is separated from this wall, so that special installation measures are required. The shape of the bridge tapered to a point was selected in order to interfere as little as possible with the sound dissipation behavior (or property) of the coaxial audio transducer system, because a bridge in such a form is impermeable to sound. For that reason, the high-tone audio transducer seated in the center of the low-medium tone audio transducer is covered by the bridge as little as possible. The MU-metal bridge is formed with a greater material thickness than the coating of the lattice-like acoustic baffle in order to provide an optimal radiation dissipation function.

This known headphone reliably provides its radiation dissipation function within the area of the acoustic baffle of the headphone. However, a substantial expenditure is required for its manufacture.

BRIEF DESCRIPTION OF THE INVENTION

The present invention provides a low-radiation headphone of the type specified above that can be manufactured at favorable cost while assuring optimal screening against radiation in the area of its acoustic baffles.

Instead of producing the acoustic baffle of each acoustic irradiation housing with a lattice-type structure coated with MU-metal and mounting the radiation dissipation zone thereon in the form of a bridge, as it is the case in the prior art, the invention provides an acoustic baffle produced as a whole from MU-metal sheet that is perforated in the area of the audio transducers and otherwise formed in a solid manner, or integrated in this area, whereby the radiation dissipation zone is formed in the perforated area of the MU-sheet metal in the form of one piece with this area. This embodiment of the acoustic baffle as defined by the invention offers the advantage that the acoustic baffle provides for even superior screening against radiation outside of the perforated area than a lattice structure coated with MU-metal. The one-piece embodiment comprising the acoustic baffle and the radiation dissipation zone provides the advantage that the manufacturing technique is substantially simplified as compared to low-radiation headphones of the prior art described above.

The net-like structure provided by perforating the MU-sheet metal exclusively in the area of the audio transducers may be embodied in a thickened manner for producing the radiation dissipation zone. However, this thickened area is preferably a perforation-free part of the otherwise perforated part of the MU-sheet metal forming the acoustic baffle.

Irrespective of its special embodiment, in which the radiation dissipation zone is extending in a tapered manner, as it is known per se, the radiation dissipation zone is formed so that it is the widest on the edge of the center of the perforated area, and the narrowest in the center of this area. In other words, the contour of the radiation dissipation zone accordingly extends in the form of a “V”. According to an advantageous further development of the invention, this radiation dissipation zone in the form of a bridge tapered in the direction of the center of the perforated area, is extended in a thickened manner beyond the perforated area up to the opposite peripheral edge of the MU-metal sheet forming the acoustic baffle. This relatively long bridge tapered to a point, provides for an optimized radiation dissipation zone as compared to the relatively short radiation dissipation zone extending from the center up to the edge of the perforated area of the MU-metal sheet forming the acoustic baffle, as explained above. A typical example of such a headphone is a small headphone resting against the ear.

Another typical example of the low-radiation headphone having the radiation dissipation zone as explained above is headphone that surrounds the ear. This headphone may be formed, for example as a headphone with front sound location. The preferably coaxial audio transducer system is for that purpose arranged out-of-center in the disk-shaped acoustic baffle, i.e. displaced to the front and downwards from a fictitiously central position in the acoustic baffle, viewed in the direction of sight of the headphone user. As a preferred form of embodiment of a low-radiation headphone with a coaxial audio transducer system in relation to its circular disk-shaped acoustic baffle for a front sound location of a sound event generated by such a converter system primarily in a small headphone resting against the ear, provision is advantageously made that a circular sector of the MU-metal sheet forming the acoustic baffle is formed from its circular edge up to the radial edges. Also in the area of the audio transducer system, partially covering the latter in a solid manner, i.e. in a non-perforated form, this circular sector containing the radiation dissipation zone, whereby the remaining acoustic baffle is perforated in the area of the audio transducer arrangement. The non-perforated area of the MU-metal sheet forming the acoustic baffle, and partly covering the coaxial audio transducer system is then located in the rear area of the respective headphone acoustic baffle in relation to a position of use of the headphone, for providing for optimal front sound location.

The solid circular sector of the MU-metal sheet forming the acoustic baffle is preferably a semicircular sector with an edge extending straight along its diameter. This semicircular sector also may have a solid area of the MU-metal sheet that is extended beyond its straight edge transversely in relation to the latter. The radiation dissipation zone is provided in this connection by the solid circular sector of the MU-metal sheet forming the acoustic baffle. In addition, the area may be structured to the extent that a bridge part extending to the rear at the top is additionally thickened, as with the headphone surrounding the ear as explained above.

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements. throughout the several views:

DETAILED DESCRIPTION OF THE INVENTION

Figure 1:
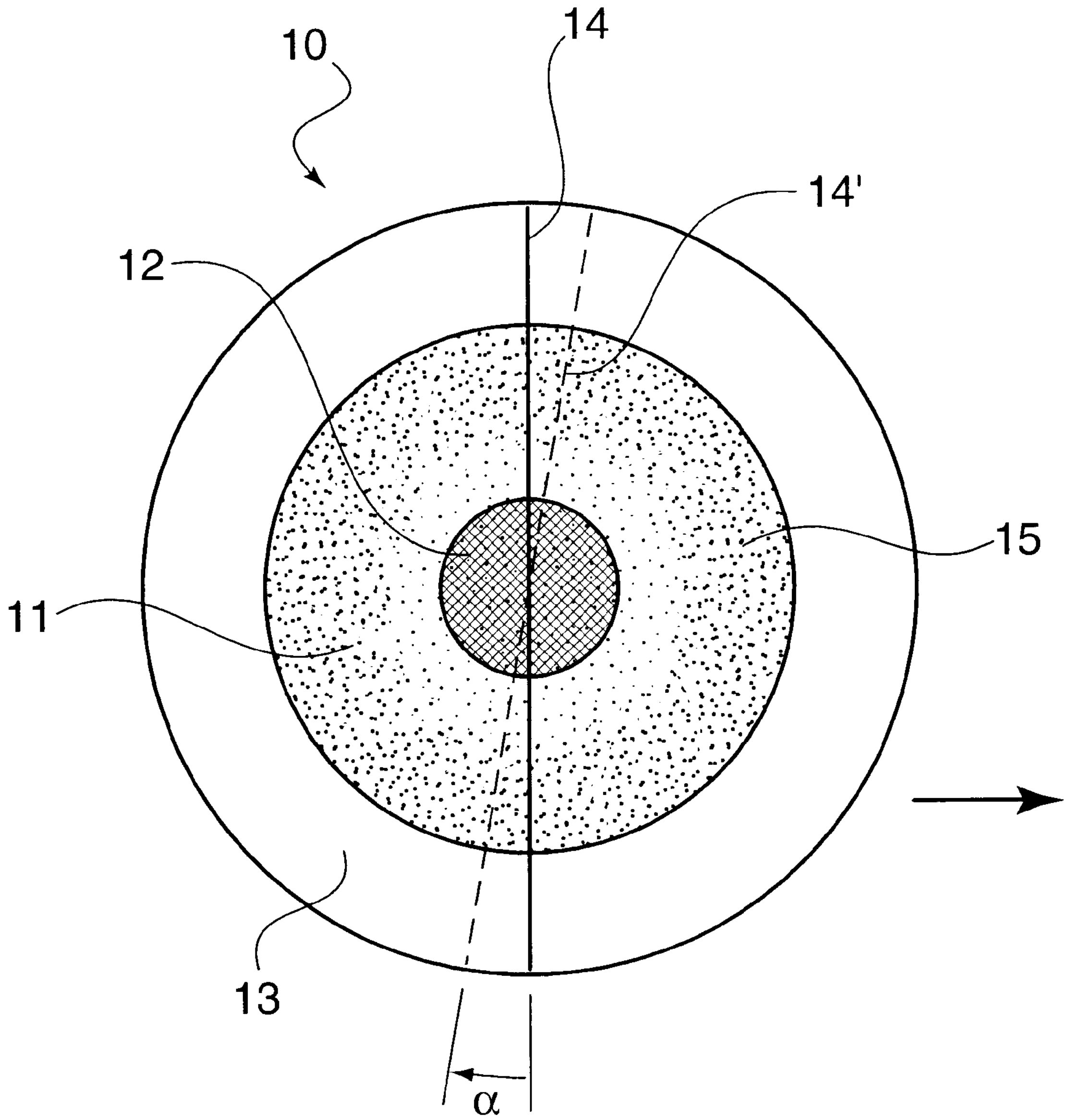
FIG. 1 shows a first embodiment of the acoustic baffle of a headphone resting against the ear whereby the front side in the position of use of the headphone is indicated by an arrow.

Referring to FIG. 1, there is shown a top view of the acoustic baffle 10 of the left acoustic irradiation housing of a low-radiation headphone. This headphone is preferably a small headphone resting against the ear and comprises an acoustic baffle structure that is formed in favor of front sound location of sound events emitted by the audio transducer of the headphone. According to the invention, acoustic baffle 10 consists of one single piece of a circular disk-shaped MU-metal sheet having zones with varying surface density. The different surface densities of the individual zones optimally protects the head of the user in a targeted manner on the side of the acoustic baffle against electric and magnetic radiation. This radiation is generated by the audio transducer system in each acoustic irradiation housing when an audio signal is admitted to the audio transducers without impairing the desired sound radiation characteristic. The audio transducers of the headphone resting against the ear are embodied in the form of a coaxial audio transducer system having a low-medium tone tweeter with a circular contour, and a high-tone tweeter having a circular contour as well. The latter is located in the center of the former. The position of the coaxial audio transducer arrangement located below acoustic baffle 10 shown in FIG. 1 is shown schematically with zones blackened to different degrees. The low-medium tone system is located below the area denoted by reference numeral 11, whereas the high tone audio transducer system is located in the center 12 of area 11.

In order to promote the front acoustic location of sound events generated by the coaxial audio transducer system, to protect the head of the user against electric and magnetic radiation, the radiation being generated when the audio transducer system is in operation, acoustic baffle 10 consists of a circular disk-shaped MU-metal sheet having zones with varying surface densities, forming one piece with the zones. A circular zone 13 disposed on the outside, is defined by the outer circular edge of acoustic baffle 10, and by the outer circular edge of area 11, below which the low-medium tone audio transducer is located. A circular segment of area 11 is characterized by a material thickness that is greater than the thickness of circular area 13. The reinforced area of the MU-material is defined by the outer circular edge of area 11 and a straight borderline 14, which is radially extending across the entire surface area of the acoustic baffle 10 and defines zones of reinforced material in the forward direction (direction indicated by the arrow). A perforated zone 15 is located on the other side of the borderline 14. The zone 15 has the shape of a circular sector as well and is defined by borderline 14, and by the outer edge area 11 on the right-hand side of borderline 14 in FIG. 1.

Alternatively, the borderline, which is shown in FIG. 1 as a vertical line, may also extend tilted by the angle "$\alpha$", as shown in FIG. 1 by the dotted line, and denoted by reference symbol 14'.

The perforated zone area 15 provides controlled on-target sound emission from the coaxial audio transducer system in the forward direction or in the forward direction with a downwardly pointing component for promoting the front audio location of sound events generated by the system. Perforated area 15 extends both over the front high tone and the low-medium tone range of the audio transducer system. On the other hand, the thickened zone in the rearward part of area 12, which for this purpose also extends both over the high-tone audio transducer and the low-tone audio transducer of the audio transducer arrangement, represents a radiation dissipation zone for discharging electric and magnetic radiation generated by the audio transducer system when it is in use. In particular, dissipation of the radiation is achieved from the temple area of the headphone user.

Therefore, while the rearward radiation dissipation zone of acoustic baffle 10 acts acoustically, and as a barrier with respect to the passage of magnetic and electric radiation, the front perforated area 15 is acoustically permeable and exclusively acts as a barrier with respect to the electric and magnetic radiation generated by the audio transducer system.

Figure 2:
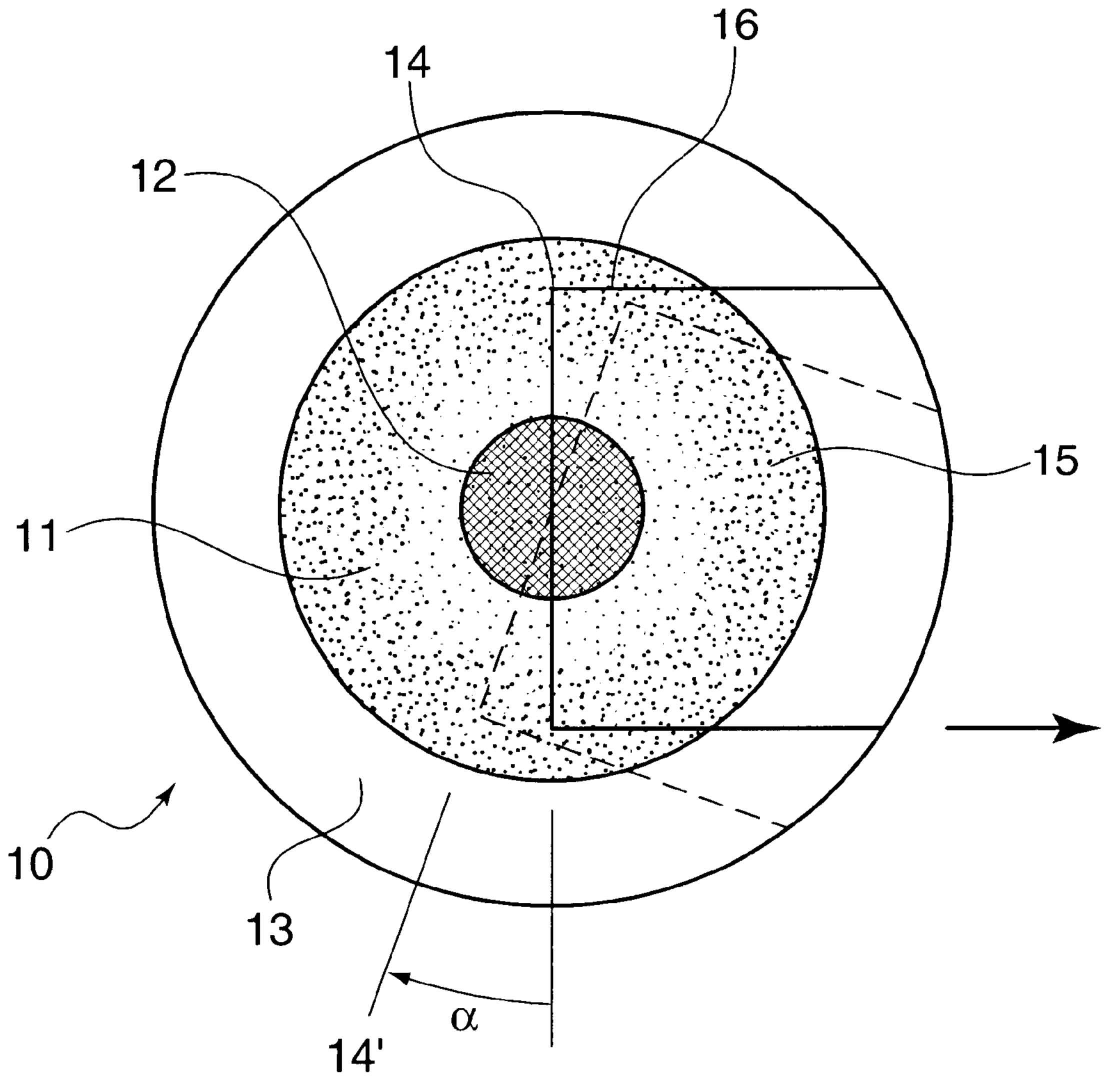
FIG. 2 shows another embodiment of the acoustic baffle according to FIG. 1 using the same representation as in FIG. 1; and, FIG. 3 shows the acoustic baffle of a headphone surrounding the ear, whereby the front side in the position of use of the headphone is indicated by an arrow.

FIG. 2 shows a modification of the embodiment of the acoustic baffle according to FIG. 1. The difference of the embodiment shown in FIG. 2 over the one shown in FIG. 1 is in that borderline 14 or its variation 14' extends in an angled manner in the forward direction within zones 11 and 13, thus defining a perforated area 15 that is defined upwardly and rearwardly by the right-angled extension of the borderline, which extends the material-reinforced component of area 11 (and 12) in the rearward part of the acoustic baffle in the forward direction, as shown in the upper part of FIG. 2 and denoted by reference numeral. 16.

Figure 3:
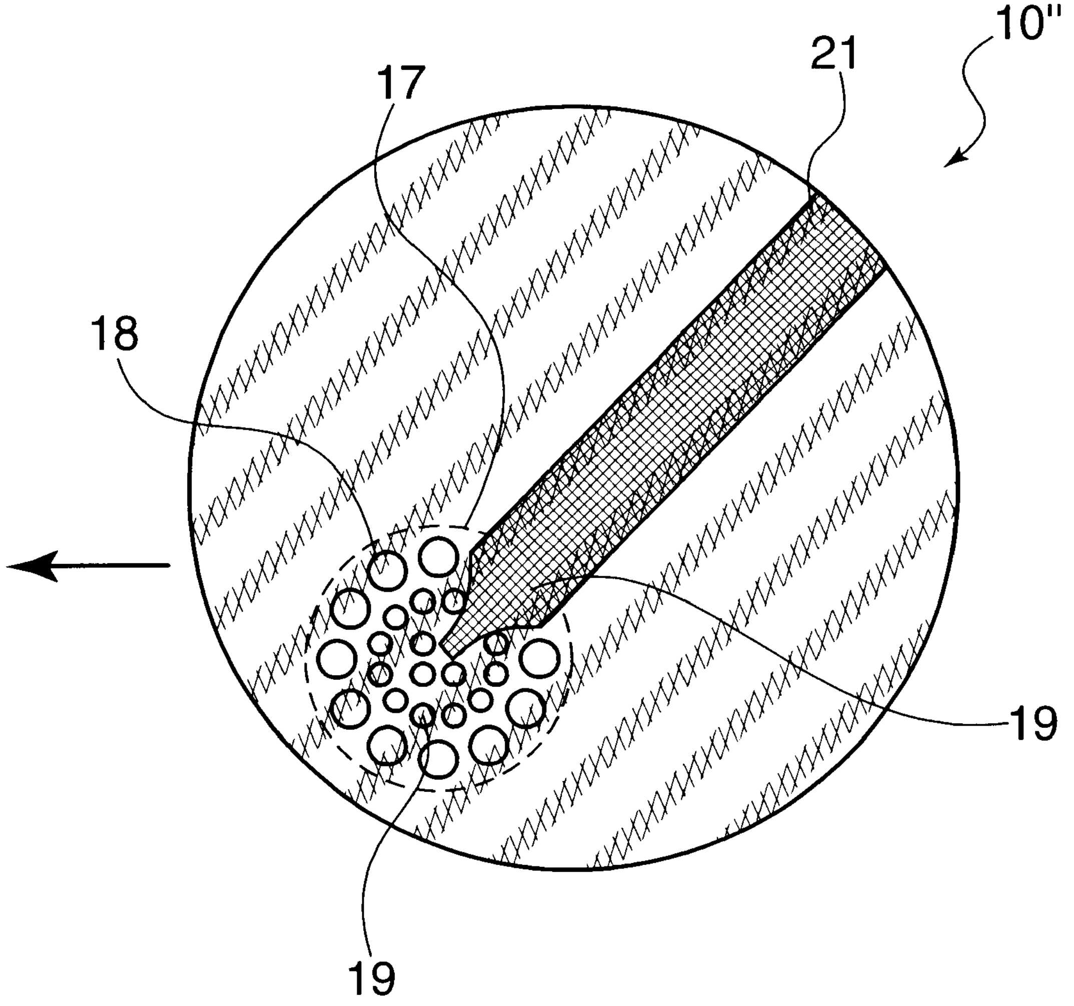

FIG. 3 shows a variation of the low-radiation headphone of the invention within the area of one of its acoustic baffles, this variation surrounding the ear. The acoustic baffle 10"

partially covers a coaxial audio transducer arrangement as well, with an outer contour 17. The acoustic baffle is one piece of a circular disk-shaped MU-metal sheet that has a multitude of breakthroughs (or passages) located above the coaxial audio transducer system. The acoustic baffle is thus perforated. These larger breakthroughs 18 (or passages) have different sizes. One of the smaller breakthroughs is schematically denoted by the reference numeral 19. Large breakthroughs 18 are disposed on an outer circle with a large diameter, whereas smaller breakthroughs 19 are disposed on two inner circles extending concentrically with the outer circle. Except for the breakthroughs, the entire acoustic baffle is solidly formed by MU-metal sheet.

In this embodiment, the radiation dissipation zone is formed by a non-perforated area 20, which, starting from the audio transducer contour 19 that encloses the perforated areas 18, 19, extends inwards to the center of the perforated area, tapered to a point. With this configuration, the emission of sound and in particular, the high tone tweeter of the coaxial audio transducer system located in the center is not unfavorably influenced. On the other hand, this design promotes the front sound location of sound events, which is substantially provided by the out-of-center arrangement of the audio transducer system in acoustic baffle 10" below. (The forward direction is again indicated by an arrow). Furthermore, the perforation-free area 20 is formed with a reinforced MU-material thickness. The thickened area is extended in the radial direction up to the opposite circular edge of acoustic baffle 10", as denoted by reference numeral 21. The slanted run of area 20 and its extended area 21 provides for an optimal radiation dissipation zone in order to optimally screen the temple region of the headphone user against electric or magnetic radiation originating from the coaxial audio transducer system, which is located below acoustic baffle 10".

Accordingly, while a few embodiments of the present invention have been shown and described, it is to be understood that many changes and modifications may be made thereunto without departing from the spirit and scope of the invention as defined in the appended claims.

What is claimed is:

1. A low-radiation headphone with acoustic irradiation housings associated with the ears of the user, for coupling to accommodating dynamic audio transducers, comprising:

an acoustic baffle disposed in each housing, and whereby said acoustic baffle is formed in a sound-permeable manner in front of the audio transducers and includes a radiation dissipation zone directed toward the temples of the user, said radiation dissipation zone being provided by a greater thickness of the MU-metal than the one in the remaining sound-permeable area of said acoustic baffle said acoustic baffle being made of a MU-metal sheet and perforated only in the area of the audio transducer, wherein the radiation dissipation zone is integrally formed in the perforated area of the MU-metal sheet.

2. The headphone according to claim 1, wherein the radiation dissipation zone is a perforation-free component of the otherwise perforated area of the MU-metal sheet forming said acoustic baffle.

3. The headphone according to claim 1 comprising a coaxial audio transducer system arranged out-of-center with respect to the center of a circular disk-shaped acoustic baffle for the front location of a sound event generated by said coaxial audio transducer system, primarily a headphone surrounding the ear, a bridge defining the radiation dissipation zone extending radially from the center of said perforated area to its edge, said center being located concentrically with said audio transducer system.

4. The headphone according to claim 3, wherein said radiation dissipation zone extends tapering from the edge to the center of said perforated area.

5. The headphone according to claim 3, wherein said radiation dissipation zone is extended in a bridged manner beyond said perforated area up to the opposite peripheral edge of the MU-metal sheet forming said acoustic baffle.

6. The headphone according to claim 1 comprising a coaxial audio transducer system disposed concentrically with a circular disk-shaped acoustic baffle for the front sound location of a sound event generated by said coaxial audio transducer system, primarily a small headphone resting against the ear, wherein a circular sector of the MU-metal sheet forms the acoustic baffle, said circular sector being located above the audio transducer system, and formed in a solid or non-perforated manner and extending from its circular edge up to the radial edges in the area of the audio transducer system, partially covering the latter, wherein the radiation dissipation zone is contained in said circular sector; and wherein the remaining acoustic baffle is perforated in the zone of said audio transducer system.

7. The headphone according to claim 6, wherein said circular sector is a semicircular sector with an edge extending in a straight line along its diameter.

8. The headphone according to claim 7, wherein said semicircular sector comprises solid MU-metal sheet areas beyond its straight-extending edge, said areas being extended transversely in relation to the straight edge.

* * * * *